United States Patent
Deodhar et al.

(10) Patent No.: US 12,021,384 B2
(45) Date of Patent: Jun. 25, 2024

(54) METHOD AND SYSTEM FOR OPTIMUM COAL SELECTION AND POWER PLANT OPTIMIZATION

(71) Applicant: Tata Consultancy Services Limited, Mumbai (IN)

(72) Inventors: Anirudh Makarand Deodhar, Pune (IN); Saurabh Jaywant Desai, Pune (IN); Mukul Patil, Pune (IN); Venkataramana Runkana, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 456 days.

(21) Appl. No.: 17/595,931

(22) PCT Filed: May 27, 2020

(86) PCT No.: PCT/IN2020/050477
§ 371 (c)(1),
(2) Date: Nov. 29, 2021

(87) PCT Pub. No.: WO2020/240592
PCT Pub. Date: Dec. 3, 2020

(65) Prior Publication Data
US 2022/0320861 A1   Oct. 6, 2022

(30) Foreign Application Priority Data
May 29, 2019  (IN) .............. 201921021329

(51) Int. Cl.
*H02J 3/00* (2006.01)
*H02J 3/14* (2006.01)

(52) U.S. Cl.
CPC ............ *H02J 3/004* (2020.01); *H02J 3/144* (2020.01); *H02J 2300/10* (2020.01)

(58) Field of Classification Search
None
See application file for complete search history.

(56) References Cited

U.S. PATENT DOCUMENTS

| 7,584,025 B2 | 9/2009 | Tanaka |
| 8,433,450 B2 | 4/2013 | Francino et al. |

(Continued)

FOREIGN PATENT DOCUMENTS

| CN | 105279700 A | 1/2016 |
| CN | 106355280 A | 1/2017 |

(Continued)

OTHER PUBLICATIONS

Erarslan, H. et al., "Optimum Blending of Coal by Linear Programming for the Power Plant at Seyitomer Coal Mine", 17th International Mining Congress and Exhibition of Turkey, Date: 2006, Publisher: IMCET, https://www.maden.org.tr/resimler/akler/bf2efbbe0c49b9f_ek.pdf.

(Continued)

*Primary Examiner* — Mohammad Ali
*Assistant Examiner* — Saad M Kabir
(74) *Attorney, Agent, or Firm* — FINNEGAN, HENDERSON, FARABOW, GARRETT & DUNNER, LLP

(57) ABSTRACT

Performance optimization of power plants is one of the major challenges. Several machine learning based techniques are available which are used for optimization of the power plants. Coal selection and blending is critical to ensuring optimum operation of thermal power plants. The present disclosure provides a system and method for optimum coal selection for the power plant and power plant optimization. The system mainly comprises two components. First, a coal usage advisory module providing coal usage and blending ratio advice to the operators based on the (Continued)

available coal. The optimization is with respect to the entire power plant operation including its components. And second, a performance optimization advisory module provides operation instruction for boiler, SCR, APH and other power plant equipment based on the implemented coal blend in real-time.

16 Claims, 7 Drawing Sheets

(56) References Cited

U.S. PATENT DOCUMENTS

| | | |
|---|---|---|
| 8,579,998 B2 | 11/2013 | Weinberg et al. |
| 9,002,530 B2 | 4/2015 | O'Connor et al. |
| 2006/0178762 A1 | 8/2006 | Wroblewski et al. |
| 2009/0038213 A1 | 2/2009 | Weinberg et al. |
| 2011/0066298 A1 | 3/2011 | Francino et al. |
| 2013/0282195 A1 | 10/2013 | O'Connor et al. |

FOREIGN PATENT DOCUMENTS

| | | |
|---|---|---|
| CN | 104215649 A | 2/2017 |
| CN | 107274027 A | 10/2017 |
| CN | 108074020 A | 5/2018 |
| CN | 105117808 B | 8/2018 |
| JP | 3385912 B | 3/2003 |

OTHER PUBLICATIONS

International Search Report and Written Opinion mailed Jan. 12, 2021, in International Application No. PCT/IN2020/050477; 10 pages.

METHOD AND SYSTEM FOR OPTIMUM COAL SELECTION AND POWER PLANT OPTIMIZATION

CROSS-REFERENCE TO RELATED APPLICATIONS AND PRIORITY

This application is an US National Stage Filing and claims priority from International Application No. PCT/IN2020/050477, filed on May 27, 2020, which application claims priority from Indian Provisional Patent Application No. 201921021329, filed on May 29, 2019. The entire contents of the aforementioned application are incorporated herein by reference.

TECHNICAL FIELD

The embodiments herein generally relate to the field of optimization of the operation of a power plant. More particularly, but not specifically, the present disclosure provides a system and method for optimum coal selection for a power plant and power plant optimization.

BACKGROUND

The modern day power plants use various ways to ensure their optimal operation on a day to day basis. Coal selection and blending is one of the critical parameters to ensure optimum operation of thermal power plants. Coal is typically transported through a series of processes before burning in a boiler. The procured coal is received and unloaded from the ships and/or trains and stored in yards. Based on the requirement, this coal is then crushed, processed and sent to coal bunkers/silos. The coal in bunkers is then sent to a pulverizer, which feeds it to the boiler for burning. There are various factors related to coal which may affect the overall performance of the thermal power plants. The factors may include, but are not limited to inherent variation in the properties of coals, blending ratio and types of coals blended, changes in properties of coal during transport/storage and so on.

The type of coal used in a power plant has large impact on the operation, health and maintenance of power plant equipment. Even though coal properties are available from the supplier, coal being an inhomogeneous mixture, properties vary from sample to sample. Hence the exact properties of the material entering the boiler may not be known in real-time. Secondly, controlling the blending ratio exactly at a given ratio may not be possible in real practice. The coal used not only affects the pulverizer-boiler but rest of the downstream equipment as well. For example, the type of coal used has severe impact on the degradation of catalyst used in selective catalytic reduction (SCR), fouling of air preheaters, and operation cost of de-sulphurizers as well as maintenance of electrostatic precipitators.

Coal is often blended together for several reasons such as economic considerations. Often a cheaper coal is added to an expensive coal to offset the coal costs. This blending of coal is typically done based on operator expertise and experience. But blending of coal has several implications on the overall optimization of the plant. There have been several drawbacks associated with blending of coals based on human expertise alone. Different methods of blending need different mixing ratio of coal. For example, coals blended before pulverizer burn more uniformly in boiler compared to when different pulverizer process different coals and mixing happens only in the boiler during burning. This calls for different operating conditions to minimize operating cost while complying with safety and emission norms.

Coals are mixed together based on heuristics and expertise of the plant operators. Typically, power plants store several types of coal in the yard and the decision with respect to which coals should be blended and sent to which boiler is complex, especially in a multiple unit operation. Suggestion of blending and coal usage is needed before it burns in the boiler (as well as for buying decision).

Coal affects not only boiler performance, but also other equipment such as SCR, flue gas de-sulphurizer (FGD). The effect is not only in terms of cost but revenue as well. Different modes of operations need different types of coal for burning. This dynamic decision is hard to make real-time. For example, a blend may work best for minimum operating cost but may not be good for operation where high ash production is beneficial.

Moreover, there is a need to look at long term impact of coal usage. For example, current systems for power plant optimization do not account for possible degradation in life of SCR/APH (air pre heater) for a given coal usage. It is difficult to account for non-additive properties while blending coals. For example, the performance of ash on two mixed coals can be very different from performance of ash of those individual coals. Also, non-additive properties are not measured real-time and hence not available for decision making. Moreover, blending decision before pulverizer are challenging and may need automatic intervention based on current performance.

The coal transport which involves storing the coal in the yard, transporting it to correct belt to send it to correct hopper/bunker and then to the boiler through pulverizer; has a lot of constraints in operations.

The coal buying decision is typically based on current market conditions and an approximate check of overall coal properties provided by the supplier. The decision of what to buy and how much to buy is not supported by the knowledge of possible combinations of coals that is beneficial to the plant. Due to this disconnect with plant operation, the operator is restricted to optimize the operation based on available coals in the yard which might not always be the best possible option.

Despite availability of advanced control systems, the reliance on the operator expertise and experience has not reduced as far as coal selection and subsequent plant optimization is considered.

SUMMARY

Embodiments of the present disclosure present technological improvements as solutions to one or more of the above-mentioned technical problems recognized by the inventors in conventional systems.

In view of the foregoing, an embodiment herein provides a system for optimum coal selection for a power plant and power plant optimization. The system comprises an input module, at least one memory and one or more hardware processors in communication with the at least one memory. The input module obtains information about one or more types of coal present at one or more locations, obtains a set of properties of the one or more types of coal either from a coal database or an operator, obtains a first set of operating parameters of the power plant, obtains a zone of operation, wherein the zone of operation is decided either by the operator or taken from system settings of the power plant, and receives a second set of operating parameters. The one or more hardware processors further comprises a coal usage advisory module and a performance optimization module. The coal usage advisory module optimizes objective function to identify the optimum set of coals and their coal blending ratio, for the obtained zone of operation based on the obtained set of properties and the first set of operating parameters using a first predictive model, wherein the first predictive model is at least one or more of a physics based fundamental model, a knowledge based model and a data-driven model, and implements the identified one or more coals along with their optimum coal blending ratio in system settings of the power plant. The performance optimization module identifies optimum operation settings for the power plant based on the second set of parameters using a second predictive model and the identified optimum set of coals, wherein the second predictive model is at least one or more of a physics based fundamental model, a knowledge based model and a data-driven model, and implements the identified optimum operation settings in the power plant to optimize the operation of the power plant.

In another aspect the embodiment here provides a method for optimum coal selection for a power plant and power plant optimization. Initially, information about one or more types of coal present at one or more locations are obtained. Similarly, a set of properties of the one or more types of coal is also obtained either from a coal database or an operator. Further, a first set of operating parameters of the power plant are also obtained. In the next step, a zone of operation is obtained, wherein the zone of operation is decided either by the operator or taken from system settings of the power plant, wherein the obtained zone of operation decides an objective function. Further, the objective function is optimized to identify the optimum set of coals and their coal blending ratio, for the obtained zone of operation based on the obtained set of properties and the first set of operating parameters using a first predictive model, wherein the first predictive model is at least one or more of a physics based fundamental model, a knowledge based model and a data-driven model. In the next step, the identified one or more coals along with their optimum coal blending ratio is implemented in system settings of the power plant. In the next step, a second set of operating parameters are received. Further, an optimum operation setting are identified for the power plant based on the second set of parameters using a second predictive model and the identified optimum set of coals, wherein the second predictive model is at least one or more of a physics based fundamental model, a knowledge based model and a data-driven model. And finally, the identified optimum operation settings are implemented in the power plant to optimize the operation of the power plant.

In yet another aspect, one or more non-transitory machine readable information storage mediums comprising one or more instructions which when executed by one or more hardware processors cause optimum coal selection for a power plant and power plant optimization. Initially, information about one or more types of coal present at one or more locations are obtained. Similarly, a set of properties of the one or more types of coal is also obtained either from a coal database or an operator. Further, a first set of operating parameters of the power plant are also obtained. In the next step, a zone of operation is obtained, wherein the zone of operation is decided either by the operator or taken from system settings of the power plant, wherein the obtained zone of operation decides an objective function. Further, the objective function is optimized to identify the optimum set of coals and their coal blending ratio, for the obtained zone of operation based on the obtained set of properties and the first set of operating parameters using a first predictive model, wherein the first predictive model is at least one or more of a physics based fundamental model, a knowledge based model and a data-driven model. In the next step, the identified one or more coals along with their optimum coal blending ratio is implemented in system settings of the power plant. In the next step, a second set of operating parameters are received. Further, an optimum operation setting are identified for the power plant based on the second set of parameters using a second predictive model and the identified optimum set of coals, wherein the second predictive model is at least one or more of a physics based fundamental model, a knowledge based model and a data-driven model. And finally, the identified optimum operation settings are implemented in the power plant to optimize the operation of the power plant.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
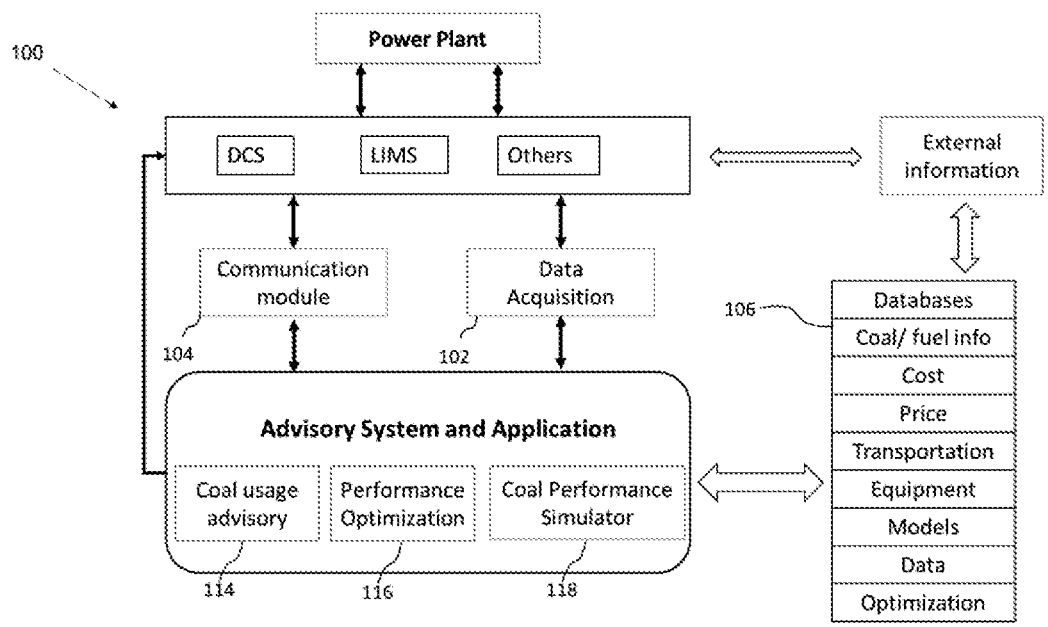
FIG. 1 illustrates a schematic overview of a system for optimum coal selection for a power plant and power plant optimization according to an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through FIG. 6B, where similar reference characters denote corresponding features consistently throughout the figures, there are shown preferred embodiments and these embodiments are described in the context of the following exemplary system and/or method.

Figure 2:
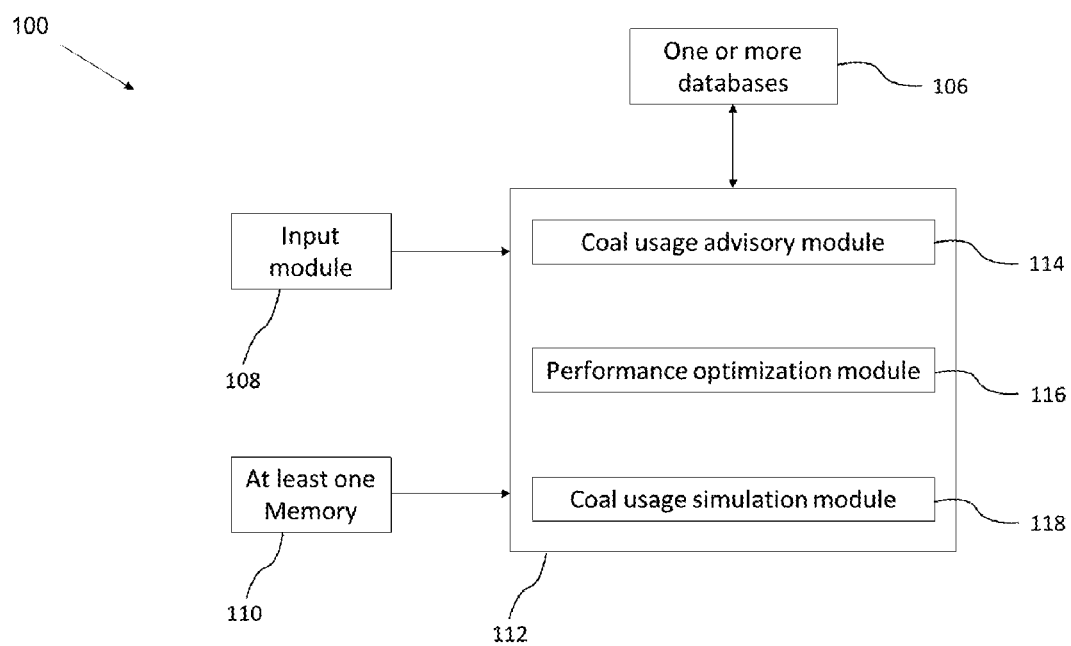
FIG. 2 illustrates a block diagram of a system for optimum coal selection for a power plant and power plant optimization according to an embodiment of the present disclosure.
Figure 3:
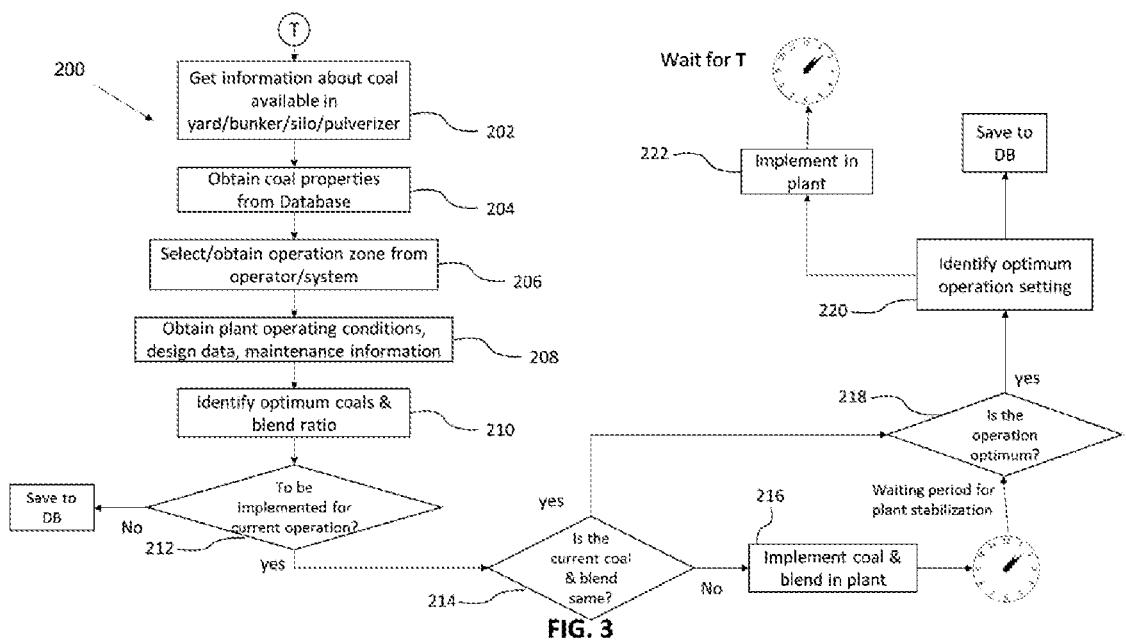
FIG. 3 shows a flowchart illustrating the steps involved in identification of optimum coals and their blending ratio in a loop according to an embodiment of the present disclosure.

According to an embodiment of the disclosure, a system 100 for optimum coal selection for a power plant and power plant optimization is shown in the schematic overview of FIG. 1 and a block diagram of FIG. 2. The system 100 ensures optimum running of the power plant, to be specific a thermal power plant. The system 100 mainly involves three important components performing different function. The three components are a real time and online coal usage advisory, a real time and online operation optimization advisory and a real time and online coal performance simulator. The system 100 is configured to utilize two types of predictive models.

As shown in FIG. 1, the coal usage and operation advisory system and application is connected to the power plant data recording, retrieval and control systems. For example, the plant distributed control system (DCS), Laboratory information management system (LIMS), historian and other systems are connected to the advisory system through a data acquisition module 102 and a communication module 104. There is also a way of entering manual data or information through the system 100. The system 100 is characterized with one or more databases 106 that stores different kinds of information such as coal property, processed plant DCS data, equipment information, maintenance information, cost related information, revenue related information, optimization results for existing coal combinations, predictive models built for the plant among others. The system 100 receives data from the plant or operator in real-time and responds back near real-time/real-time in terms of actionable control decisions for the plant. The system 100 can be implemented wither on the edge or on a cloud platform. The edge means the system is implemented in the same place where the power plant is present, it is in the same plant, physically right there. While in the case of cloud, the system 100 can be implemented on the cloud platform and can be accessed via some network.

According to an embodiment of the disclosure, the system 100 include an input module 108, at least one memory 110 and one or more hardware processor 112 as shown in the block diagram of FIG. 2. In some example the data acquisition module 102 and the input module 108 can be the same module. The one or more hardware processors 112 works in communication with at least one memory 110. The one or more hardware processors 112 are configured to execute a plurality of algorithms stored in at least one memory 110. The one or more hardware processors 112 further includes a plurality of modules for performing various functions. The one more hardware processors 112 includes a coal usage advisory module 114, a performance optimization module 116 and a coal usage simulation module 118. The one or more hardware processors 112 may further comprise other modules for performing certain functions.

The input module 102 is configured to obtain the input for the system 100. The input module 102 is configured to obtain information about one or more types of coal present at one or more locations, a set of properties of the one or more types of coal either from a coal database or an operator, to obtain a zone of operation, wherein the zone of operation is decided either by the operator or taken from system settings of the power plant, and obtain a first set of operating parameters of the power plant. In an embodiment, the input module 102 and the user interface can be the same component of the system 100. The input module 102 and the user interface (UI) can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite.

According to an embodiment of the disclosure, the system 100 includes the coal usage advisory module 1164. The working of the coal usage advisory module 114 is shown in the flowchart 200 of FIG. 3. The coal usage and performance optimization advisory loop is triggered by trigger T. At step 202, the trigger T initializes the sequence of operations mentioned in the figure. The trigger can be any one of the following:

Manual trigger—The operator triggers the advisory loop to identify next set of coals and their best possible blending ratio for optimum operation of the plant. Operator may trigger this even to check a specific combination of coals for a specific zone of operation.

Operation zone change—The operator changes the objective of the operation. For example, it changes from minimum operating cost to maximum ash revenue zone.

Load change—The demand from the grid changes, or the operator decides to operate the plant at lower load due to some equipment constraints.

Coal change/inventory alert—The operator provides or an automatic alert shows up displaying the need of identifying optimum set of coals from yard/bunker and their best blending ratio for an optimum operation.

Auto-trigger—The system has a time trigger or auto optimum check trigger after every fixed time interval.

Once triggered, in the next step 204 the system 100 retrieve the information of coal in the boiler/pulverizer/bunker or yard, either automatically based on Distributed control system/Laboratory information management system (DCS/LIMS) connectivity or from the operator manually. Once the coals are identified, the various information related to that coal is retrieved from the database of coal. Information may include, but not limited to, coal proximate/ultimate analysis, coal kinetic parameters. In addition, information such as design information of equipment such as boiler, pulverizer along with heat/mass transfer parameters of the process can be obtained from the database. Alternatively, a user can input these values as well. In addition, maintenance information related to specific equipment may also be obtained. For example, replacement date of SCR catalyst can be obtained from database/plant historian.

At step 206, the zone of operation is obtained that decides the objective function. For example, the objective can be to optimize overall operating cost. Zone of operation can be manually altered or can be obtained from what is already set in the system earlier.

At step 208, the operating parameters of the power plant are obtained that include various process parameters, set points and manipulated control parameters. For example, for FGD unit the set point of SO2 at exit, amount of limestone used etc. can be obtained. For a boiler, various control parameters such as burner orientations, air distribution, and excess oxygen can be obtained. At step 210, the first predictive models and optimization algorithms are used to identify the optimum set of coals and their blending ratio for the set zone of operation.

At step 212 it is checked if the results (optimum set of coals and their blending ratio) obtained are to be used for real-time operation or saved for future use. In a simulator such results can be just checked by the operator and saved for future use in database. For real-time use, the current coals and blends in use are checked against the ones set in optimization loop at step 214.

At step 216, if the current coal in use and blending ratio is not matching with that in the optimization loop, the identified settings are implemented in the plant. Once implemented there is a waiting period till the coal change completes and plant reaches a steady operation.

At step 218, if the current coal in use and blending ratio is matching with that in the optimization loop, the system 100 automatically checks if the manipulated control parameters of the plant are optimum or not. If the manipulated control parameters of the plant are optimum, the coal set, blending ratio, zone of operation along with the plant operating parameters and control variable settings are identified at step 220 and sent to the power plant at step 222. In addition to that, the coal set and the coal blending ratio are also saved to the one or more database 106 as an optimum record. These settings can be used in future for similar situation again.

If the plant is found to be not under optimum operation, new settings are obtained by another optimization loop that finds the best settings for selected coal blend, zone of operation and load, ambient conditions. The system 100 further uses a second set of predictive models and optimization algorithms. The results are saved to the database as a new optimum record and then implemented in the power plant. The system 100 waits for the next trigger and the process repeats.

In an embodiment of the disclosure, the operator can also modify and implement his own settings based on his experience. In such cases the operator may neglect the identified optimum settings and implement his own coal blending ratio.

Figure 4:
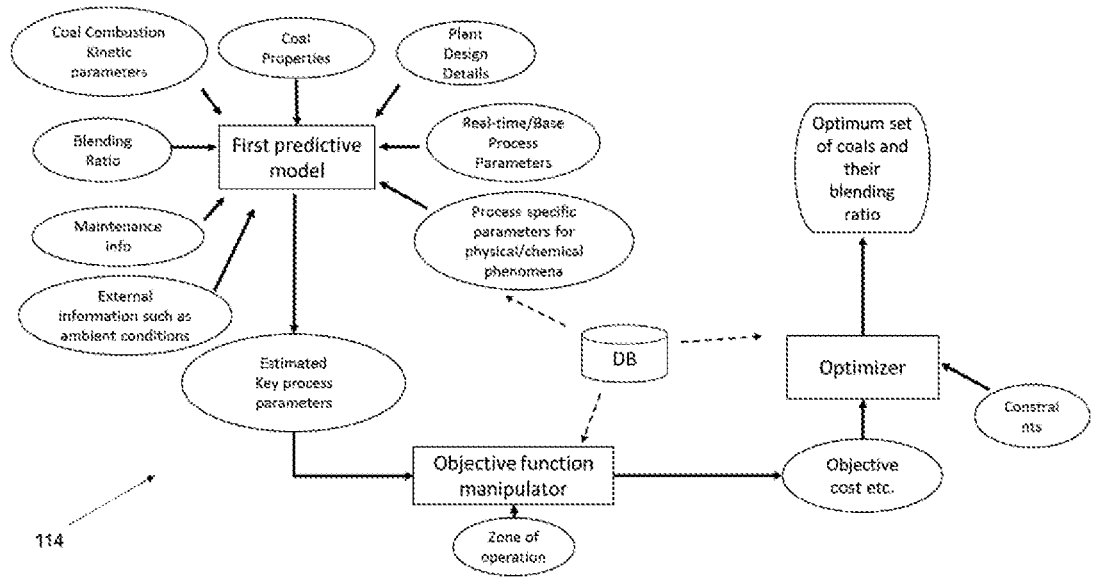
FIG. 4 shows schematic representation of a coal usage advisory module according to an embodiment of the present disclosure.

According to an embodiment of the disclosure, a schematic diagram of the coal usage advisory module 114 for identification of the best coals and their coal blending ratio is shown in FIG. 4. For the identification of the optimum set of coals and blend ratio a first predictive model is used. The first predictive model is at least one or more of a physics based fundamental model, a knowledge based model and a data-driven model. The first predictive model is built offline and can be utilized later. It should be appreciated that the system 100 can also use more than one predictive models. The unique feature of the first predictive model is they may receive a set of properties of the one or more types of coals as input. The set of properties can be obtained from a coal database or by the operator. The set of inputs that may be used by first predictive model comprise of:

The set of properties may include:
Types of coals to be used and their properties including proximate analysis, ultimate analysis, hardness index, GCV and so on
Coal blending ratios to assessed (practical limits on ratios from DB)
Coal combustion related parameters such as kinetic parameters
The first set of operating parameters may include:
Coal combustion kinetic parameters,
Process parameters measured by sensors,
The power plant design parameters,
Power plant maintenance information,
External information such as ambient conditions, and
A set of mathematically defined process parameters
Values of process parameters measured by sensors in plant or pre-decided values of those parameters stored in DB based on past experience. These may include operating settings of the plant as well as parameters such as loads, ambient conditions, and soot blowing among others.
Plant design parameters which may include dimensions and architecture of specific equipment. For example, the spacing between catalysts layers of SCR, cross sectional area of SCR or catalyst packing density of SCR.
Maintenance information such as previous cleaning record for air preheater, previous replacement of a pulverizer roller and so on.
Parameters that mathematically define process, such as heat transfer coefficients, mass transfer rates, radiation parameters and so on.

The first predictive model receives at least one of the above as inputs and predicts the identified key process indicators of the power plant. For example, the first predictive model may predict SCR outlet NOX, APH outlet gas temperature, power consumption by pulverizer and fans, quantity of gypsum produced in FGD and so on.

According to an embodiment of the disclosure, the system 100 is also configured to obtain a zone of operation of the power plant. The zone of operation is decided either by the operator or taken from system settings of the power plant. Further, an objective function is manipulated based on the selected zone of operation. The zone of operation depends upon the current requirement on how the power plant should be operated. For example, the aim can be to operate the power plant at reduced load to extend the life of air preheater, or to produce high quality bottom ash for maximizing ash revenue. The objective function is manipulated accordingly.

Objective function in general is formulated as follows—

Objective function=$G[f1(w_1X_1), f2(w_2X_2), f3(w_3X_1), f4(w_4X_4), f5(w_5X_5), fn(w_nX_n)]$ Where,
X—Key performance indicator value such as pollutants concentration, power consumed, degradation estimate and so on
w—Weights or functions of weight provided based on the importance of that key process indicator Depending upon the zone of operation, weights w can be varied for each of the X's, thereby increasing or decreasing the priority given to each of the indicators. For example, in minimum operation cost mode all the cost parameters X will be provided higher weights compared to remaining parameters. If the objective is to reduce the cost of FGD operation, X which may be SOX processed by FGD may be given a higher weight. When this objective function is used with the above mentioned workflow, the coals and the blend selected will ensure low production of SOX and hence less FGD operation cost. This is just a simple example, more complex scenario can be handled through this mechanism.

Once the objective function is manipulated using above technique, further various techniques can be used to identify the optimum set of coals and their blending ratio so as to ensure that the objective set is met without compromising on the constraints provided using the coal usage advisory module 114. Constraints are typical operation settings that have some limitations. For example, even when the objective is to minimize FGD operation cost and SOX, the temperatures in the boiler should rise above certain limits or RPM of the pulverizer cannot be increased beyond a safe limit. The constraints can be set as defaults or can be obtained from the operator manually. Different optimization techniques can be used to realize the optimum, such as GA, Linear programming, Quadratic programing and others. Alternatively, one can also use agent based learning such as reinforcement learning to identify optimum set of coals or best set of operating conditions for the given objective. The outcome of the optimization is the selection of coals from the earlier provided set of coals and their best blending ratio, for the provided zone of operation. The number of coals selected as best could be single or combination of multiple coals.

The workflow described above can be used offline as well as online to deliver real-time optimum solution from coal and blending ratio perspective for the selected zone of operation.

According to an embodiment of the disclosure, the system 100 further comprises the performance optimization module 116. The performance optimization module 116 is configured to identify an optimum operation setting for the power plant based on the second set of parameters using a second predictive model and the identified optimum set of coals. It should be appreciated that the second predictive model may also be a combination of more than one predictive models. The identified optimum operation settings are then implemented in the power plant to optimize the operation of the power plant. It should be appreciated that the identified optimum operation settings for the power plant can also be saved in the one or more database 106 for future use.

Figure 5:
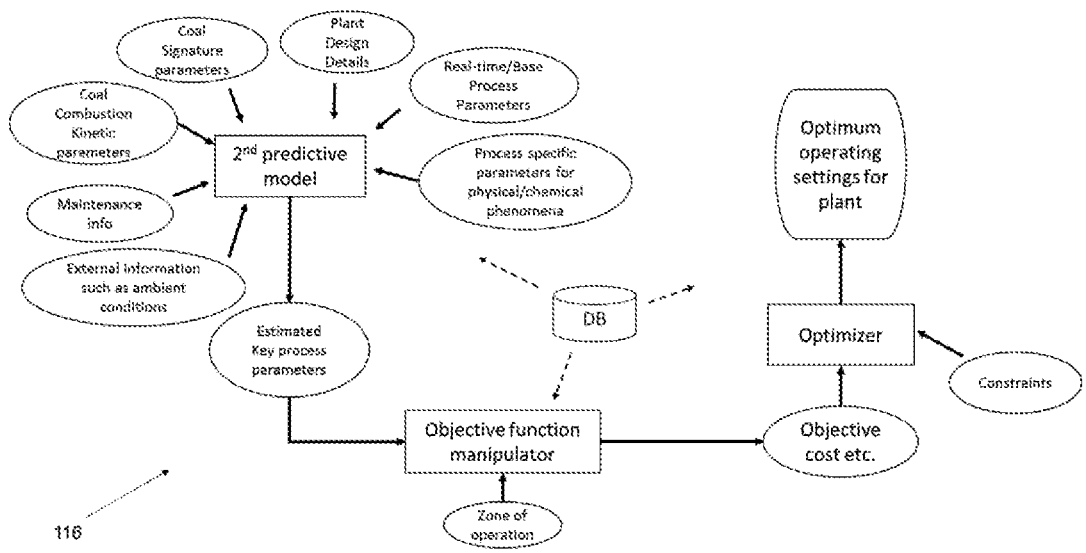
FIG. 5 shows schematic representation of a performance optimization module according to an embodiment of the present disclosure.

Once the optimum coal is selected based on the first predictive model, next step is to identify optimum settings for the given zone of operation using the second predictive model as shown in the schematic diagram of FIG. 5. Different type of predictive models are required for identifying optimum settings because some of the information such as coal properties is either unavailable in real-time or is not very accurate. Hence the idea of using the second predictive model is to improve on the result obtained by the first predictive model in real-time and online. This allows for adjustment with respect uncertainties in present coal properties and plant conditions.

The steps involved in the identification of the optimum settings of the power plant is same as the steps involved in identifying optimum coal and their blending ratio by the coal advisory module 114. However, for identification of optimum operation settings for selected best coals and blend ratio (burning in plant), the second predictive model is used. The second predictive model is at least one or more of a physics based fundamental model, a knowledge based model and a data-driven model. The models may receive the following as the second set of operating parameters:

Coal signature parameters that are representative performance indicators for the specific coal in use. These are actual measured values from sensors of the plant that represent coal properties. For example, measured parameters related to heat balance of the grinding system represent the moisture in the coal. Pressure and flow parameters in the grinding system indicate hardness and size of the coal. Likewise, other measured parameters in the boiler system as well as downstream equipment represent signatures of coal in some way or the other. Moreover, these parameters can also be identified separately by applying a combination of machine learning and physics know-how, if relevant past data from the plant is available. These are used because exact coal properties typically cannot be measured real-time and online.

Coal combustion related parameters such as kinetic parameters

Values of process parameters measured by sensors in plant or base values of those parameters stored in the database based on past experience. These may include operating settings of the plant as well as parameters such as loads, ambient conditions, and soot blowing among others. These also include manipulated control variables. Examples include set points for various equipment such as SCR outlet NOX set point, Boiler burner orientations, air distribution in boiler, pulverizer combinations used, number of pumps used in FGD, rotation speed of air preheater element and so on.

Plant design parameters which may include dimensions and architecture of specific equipment. For example, the spacing between catalysts layers of SCR, cross sectional area of SCR or catalyst packing density of SCR.

Maintenance information such as previous cleaning record for air preheater, previous replacement of a pulverizer roller and so on.

Parameters that mathematically define process, such as heat transfer coefficients, mass transfer rates, radiation parameters and so on.

process parameters measured by sensors the power plant design parameters power plant maintenance information external information such as ambient conditions a set of mathematically defined process parameters Some of the second set of operating parameters above can be obtained from the operators or can be retrieved from the database for re-use. The second predictive model receive at least one the above as inputs and predict the identified key process indicators of the power plant. For example, the second predictive model may predict SCR outlet NOX, APH outlet gas temperature, power consumption by pulverizer and fans, quantity of gypsum produced in FGD and so on.

The remaining steps including the objective function manipulation and optimization is analogous to the optimum coal workflow. The output of the performance optimization module 116 is the optimum operation settings for the power plant such as SCR outlet NOX set point, boiler burner orientations, air distribution in boiler, pulverizer combinations used, number of pumps used in FGD, rotation speed of air preheater element and so on.

According to an embodiment of the disclosure, the system 100 further comprises the coal usage simulation module 118. The coal usage simulation module 118 is configured to simulate the usage of coal in the power plant for the selected zone of operation. The coal usage simulation module 118 allows the operator to do what if scenario analysis for coals available in yard or bunker for the selected zones of operation. The coal usage simulation module 118 can be used while taking coal procurement decisions as well. It provides visibility into operation of the plant to the coal buyer. Instead of just going by market conditions and average requirements from plant, the disclosure can provide the coal usage simulation module 118 to check the benefits of buying specific coals that are available in market. In addition, the disclosure provides the best choice of coals to buy and their quantity given the need from the plant and their properties.

Figure 6A:
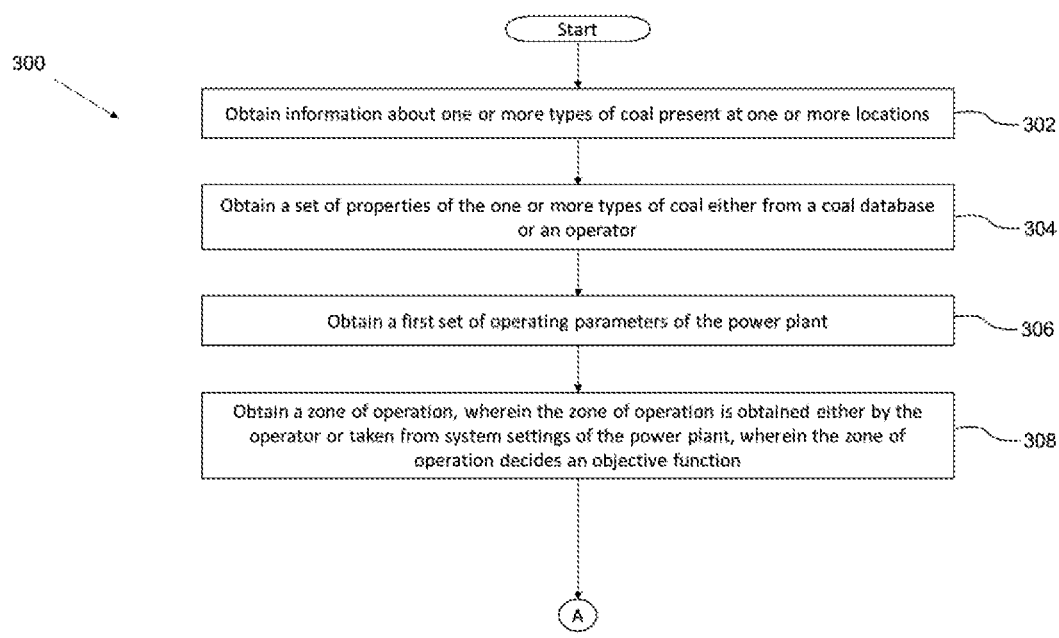
FIGS. 6A-6B is a flowchart illustrating the steps involved in optimum coal selection for a power plant and power plant optimization according to an embodiment of the present disclosure.
Figure 6B:
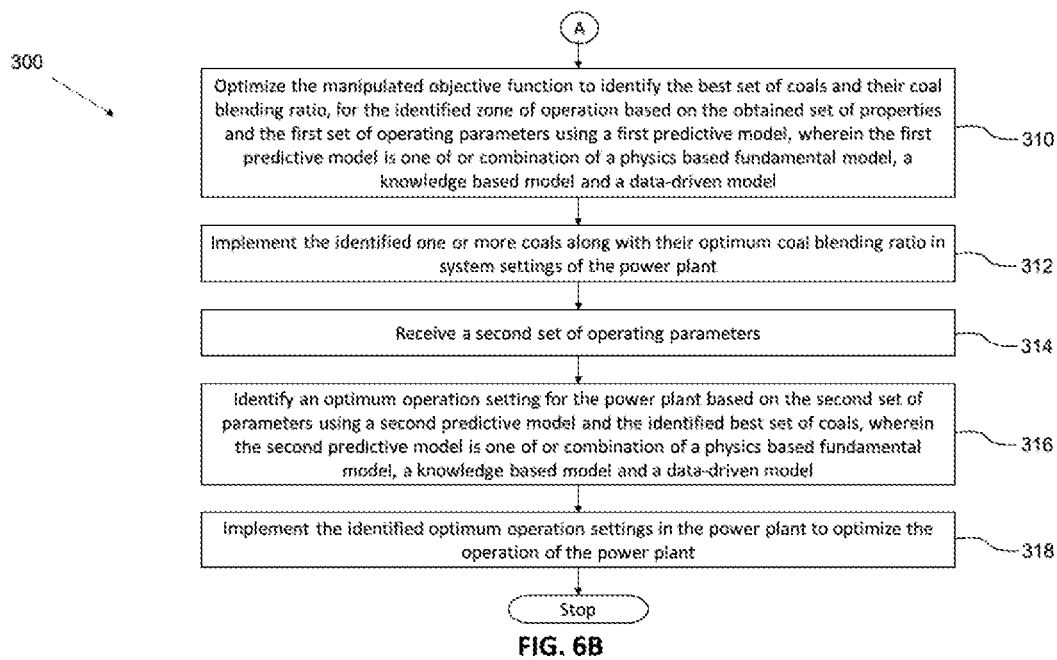

In operation, a flowchart 300 illustrating a method for optimum coal selection for a power plant and power plant optimization is shown in FIG. 6A-6B. Initially at step 302, information about one or more types of coal present at one or more locations is obtained. This information is provided by the seller, it can also be obtained from the other sources.

At step 304, the set of properties of the one or more types of coal are obtained either from the one or more database 106 or an operator. Similarly, at step 306, the first set of operating parameters of the power plant are obtained.

In the next step 308, the zone of operation is obtained, wherein the zone of operation is obtained either by the operator or taken from system settings of the power plant. The objective function is a function of key performance indicator value and their corresponding weights.

In the next step 310, the objective function is optimized to identify the optimum set of coals and their coal blending ratio, for the obtained zone of operation based on the obtained set of properties and the first set of operating parameters using the first predictive model. The first predictive model is at least one or more of a physics based fundamental model, a knowledge based model and a data-driven model. At step 312, the identified one or more coals along with their optimum coal blending ratio is implemented in system settings of the power plant. The optimum coal blending ratio can also be saved in the one or more database 106 for future use. Though it should be appreciated that in another example, the user can also implement his own blending ratio of the power plant based on his experience.

In the next step 314, the second set of operating parameters are received as the input to the system 100. The second set of operating parameters include coal signature parameters, coal combustion parameters, process parameters measured by sensors, the power plant design parameters, power plant maintenance information, and a set of mathematically defined process parameters. At step 316, the optimum operation setting for the power plant are identified based on the second set of parameters using the second predictive model and the identified optimum set of coals. The second predictive model is at least one or more of a physics based fundamental model, a knowledge based model and a data-driven model. And finally at step 318, the identified optimum operation settings are implemented in the power plant to optimize the operation of the power plant.

It should be appreciated that the method of optimum coal selection can also be used in more than one units in the power plant, with appropriate constraints and priorities. For example, the optimum coal is not only for one boiler, if there are more than one boiler, then the system 100 can be used to recommend separate coal blending ratio to each of the boiler present in the power plant. Each unit of the power plant will have their own model to identify the optimum settings.

It should be appreciated that the system 100 can also be for various other application by a person skilled in the art. For example, with some modifications the above workflow and method can also be used for bio-mass co-fired boilers. Similarly the method can be adopted to different types of boilers such as critical/supercritical/sub-critical boilers or tangential/opposed fired boilers. In addition, the method can also be extended to variety of grinding equipment and blending methods. Moreover, the method can also cater to premixed blending of coal where coals are mixed before they enter the pulverizers. Moreover, the method can also be extended to systems where different pulverizers handle different coals and no mixing of coals is done before the boiler.

According to an embodiment of the disclosure, the system 100 can also be used to look at the long term impact of the coal usage. For example, the system 100 can take into account for possible degradation in life of SCR/APH for a given coal usage. It may also take care for non-additive properties while blending coals.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein solve the problems related to performance optimization of the power plants. The disclosure provides a method and system for optimum coal selection for a power plant and power plant optimization.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

The invention claimed is:

1. A processor implemented method for optimum coal selection for a power plant and power plant optimization, the method comprising:
    obtaining, via one or more hardware processors, information about one or more types of coal present at one or more locations;
    obtaining, via the one or more hardware processors, a set of properties of the one or more types of coal from at least one of a coal database or an operator;
    obtaining, via the one or more hardware processors, a first set of operating parameters of the power plant;
    obtaining, via the one or more hardware processors, a zone of operation, wherein the zone of operation is decided by at least one of the operator or taken from system settings of the power plant, wherein the zone of operation decides an objective function;
    optimizing, via the one or more hardware processors, the objective function to identify an optimum set of coals and their coal blending ratio, for the obtained zone of operation based on the obtained set of properties and the first set of operating parameters using a first predictive model, wherein the first predictive model is at least one or more of a physics based fundamental model, a knowledge based model and a data-driven model;
    implementing, the via one or more hardware processors, the identified one or more coals along with their optimum coal blending ratio in the system settings of the power plant;
    receiving, the via one or more hardware processors, a second set of operating parameters;
    identifying, via the one or more hardware processors, an optimum operation setting for the power plant based on the second set of parameters using a second predictive model and the identified optimum set of coals, wherein the second predictive model is at least one or more of a physics based fundamental model, a knowledge based model and a data-driven model; and
    implementing, via the one or more hardware processors, the identified optimum operation settings in the power plant to optimize the operation of the power plant.

2. The method of claim 1 further comprising the step of simulating the usage of coal in the power plant for the selected zone of operation using a coal usage simulation module.

3. The method of claim 1, further comprising the step of providing a trigger to start the performance optimization of the power plant.

4. The method of claim 1 further comprising the step of matching the identified one or more coals and an optimum coal blending ratio with the existing system settings of the power plant.

5. The method of claim 1 further comprising the step of saving the identified one or more coals and an optimum coal blending ratio and identified optimum operation settings in the database.

6. The method of claim 1 further comprising the step of determining an objective function, wherein the objective function is manipulated based on the obtained zone of operation.

7. The method of claim 5, wherein the objective function is a function of key performance indicators and weights provided based on the importance of the key performance indicators.

8. The method of claim 1, wherein the set of properties of the one or more types of coal comprises:
    coal proximate analysis and ultimate analysis, and
    coal combustion kinetic parameters.

9. The method of claim 1, wherein the first set of operating parameters of power plants comprises:
    coal combustion kinetic parameters,
    process parameters measured by sensors,
    the power plant design parameters,
    power plant maintenance information,
    ambient conditions, and
    a set of mathematically defined process parameters.

10. The method of claim 1 further comprising the step of manipulating the objective function when the zone of operation is obtained.

11. The method of claim 1, wherein the method of optimum coal selection is configured to be used in more than one units in the power plant.

12. The method of claim 1, wherein the one or more location is a boiler, a pulverizer, a bunker or a location in coal handling place.

13. The method of claim 1, wherein the second set of operating parameters comprises:
    coal signature parameters,
    coal combustion kinetic parameters,
    process parameters measured by sensors,
    the power plant design parameters,
    power plant maintenance information,
    ambient conditions, and
    a set of mathematically defined process parameters.

14. A system for optimum coal selection for a power plant and power plant optimization, the system comprising:
    an input module for:
        obtaining information about one or more types of coal present at one or more locations,
        obtaining a set of properties of the one or more types of coal from at least one of a coal database or an operator,
        obtaining a first set of operating parameters of the power plant,
        obtaining a zone of operation, wherein the zone of operation is decided by at least one of the operator or taken from system settings of the power plant, wherein the obtained zone of operations decides an objective function and receiving a second set of operating parameters;

at least one memory; and one or more hardware processors in communication with the at least one memory, wherein the one or more hardware processors further comprises:

a coal usage advisory module for:

optimizing the manipulated objective function to identify the optimum set of coals and their coal blending ratio, for the obtained zone of operation based on the obtained set of properties and the first set of operating parameters using a first predictive model, wherein the first predictive model is at least one or more of a physics based fundamental model, a knowledge based model and a data-driven model, and implementing the identified one or more coals along with their optimum coal blending ratio in system settings of the power plant; and a performance optimization module for:

identifying an optimum operation setting for the power plant based on the second set of parameters using a second predictive model and the identified optimum set of coals, wherein the second predictive model is at least one or more of a physics based fundamental model, a knowledge based model and a data-driven model, and implementing the identified optimum operation settings in the power plant to optimize the operation of the power plant.

15. The system of claim 14 further comprising a coal usage simulation module to simulate the usage of coal in the power plant for the obtained zone of operation.

16. A computer program product comprising a non-transitory computer readable medium having a computer readable program embodied therein, wherein the computer readable program, when executed on a computing device, causes the computing device to:

obtaining information about one or more types of coal present at one or more locations;

obtaining a set of properties of the one or more types of coal from at least one of a coal database or an operator;

obtaining a first set of operating parameters of the power plant;

obtaining a zone of operation, wherein the zone of operation is decided by at least one of the operator or taken from system settings of the power plant, wherein the zone of operation decides an objective function;

optimizing the objective function to identify an optimum set of coals and their coal blending ratio, for the obtained zone of operation based on the obtained set of properties and the first set of operating parameters using a first predictive model, wherein the first predictive model is at least one or more of a physics based fundamental model, a knowledge based model and a data-driven model;

implementing the identified one or more coals along with their optimum coal blending ratio in the system settings of the power plant;

receiving a second set of operating parameters;

identifying an optimum operation setting for the power plant based on the second set of parameters using a second predictive model and the identified optimum set of coals, wherein the second predictive model is at least one or more of a physics based fundamental model, a knowledge based model and a data-driven model; and implementing the identified optimum operation settings in the power plant to optimize the operation of the power plant.

* * * * *